(12) United States Patent
Bae

(10) Patent No.: US 10,625,171 B2
(45) Date of Patent: Apr. 21, 2020

(54) PREFABRICATED DINOSAUR MODEL

(71) Applicant: FUTURE CYBER, INC, Nam-gu, Gwangju (KR)

(72) Inventor: Jung Bin Bae, Yangpyeong-gun (KR)

(73) Assignee: FUTURE CYBER, INC., Nam-gu Gwangju (KR)

(*) Notice: Subject to any disclaimer, the term of this patent is extended or adjusted under 35 U.S.C. 154(b) by 27 days.

(21) Appl. No.: 16/083,133

(22) PCT Filed: Nov. 4, 2016

(86) PCT No.: PCT/KR2016/012635
§ 371 (c)(1),
(2) Date: Sep. 7, 2018

(87) PCT Pub. No.: WO2018/043814
PCT Pub. Date: Mar. 8, 2018

(65) Prior Publication Data
US 2019/0091591 A1  Mar. 28, 2019

(30) Foreign Application Priority Data

Aug. 29, 2016  (KR) .................. 10-2016-0110126

(51) Int. Cl.
*A63H 3/16*  (2006.01)
*A63H 3/20*  (2006.01)
(Continued)

(52) U.S. Cl.
CPC ............. *A63H 3/16* (2013.01); *A63H 3/20* (2013.01); *A63H 3/46* (2013.01); *A63H 9/00* (2013.01); *G09B 19/10* (2013.01); *G09B 23/36* (2013.01)

(58) Field of Classification Search
CPC . A63H 3/16; A63H 3/46; A63H 13/00; A63H 13/02; A63H 13/005; A63H 13/16;
(Continued)

(56) References Cited

U.S. PATENT DOCUMENTS 4,946,413 A * 8/1990 Lehmann ............. A63H 17/008
446/28
6,544,094 B1 * 4/2003 Maddocks ............ A63H 3/365
446/175
(Continued)

FOREIGN PATENT DOCUMENTS

JP  H09-173656 A   7/1997
JP  2003-024654 A  1/2003
(Continued)

OTHER PUBLICATIONS

KR Office Action from the Korean Intellectual Property Office (with English translation), issued in Korean Patent Application No. 10-2016-0110126, with a dispatched date of Jun. 20, 2017.

*Primary Examiner* — Laura Davison
(74) *Attorney, Agent, or Firm* — Harness, Dickey & Pierce, P.L.C.

(57) ABSTRACT

The present disclosure relates to a prefabricated dinosaur model comprising a skeleton frame which includes a head bone part, a neck bone part, a trunk bone part, a tail bone part, and a leg bone part and forms a skeleton corresponding to an external shape of the dinosaur when assembled; a joint connection part provided at a connection part of the skeleton frame to enable movement of the skeleton frame; and an outer skin which includes an outer skin of the head, an outer skin of the neck, an outer skin of the trunk, an outer skin of the tail, and an outer skin of the leg individually corresponding to the skeleton frame, and directly coupled to corresponding parts of the skeleton frame individually in a detachable manner.

4 Claims, 8 Drawing Sheets

(51) Int. Cl.
*A63H 3/46* (2006.01)
*G09B 19/10* (2006.01)
*G09B 23/36* (2006.01)
*A63H 9/00* (2006.01)

(58) Field of Classification Search
CPC .......... A63H 33/38; A63H 33/42; A63H 3/20;
G09B 23/36; Y10T 74/20588; Y10T
74/20594; Y10T 74/20606
USPC ........... 446/97, 337–339, 368, 373, 375–384
See application file for complete search history.

(56) References Cited

U.S. PATENT DOCUMENTS

| | | |
|---|---|---|
| 6,672,934 B2 | 1/2004 | Hornsby et al. |
| 6,746,303 B2 | 6/2004 | Beidokhti |
| 6,905,390 B2 * | 6/2005 | Fukui ...................... B25J 19/00 |
| | | 446/337 |
| 9,474,981 B1 * | 10/2016 | Forti ...................... A63H 3/365 |
| 9,610,512 B2 * | 4/2017 | Bae ...................... A63H 33/086 |
| 10,137,616 B2 * | 11/2018 | Reetz ...................... B29C 44/56 |
| 2006/0071424 A1 * | 4/2006 | Burge ...................... A63F 9/12 |
| | | 273/153 R |

FOREIGN PATENT DOCUMENTS

| | | |
|---|---|---|
| JP | 2006-262944 A | 10/2006 |
| KR | H10-005450 A | 1/1998 |
| KR | 20-0218824 Y1 | 4/2001 |
| KR | 10-2003-0074580 A | 9/2003 |
| KR | 20-0434385 Y1 | 12/2006 |
| KR | 10-2014-0053658 A | 5/2014 |

* cited by examiner

PREFABRICATED DINOSAUR MODEL

CROSS-REFERENCE TO RELATED APPLICATIONS

This application is a 371 U.S. National Stage of International Application No. PCT/KR2016/012635, filed Nov. 4, 2016, and published in Korean as WO 2018/043814 A1 on Mar. 8, 2018. This application claims the benefit of and priority to Korean Application No. 10-2016-0110126, filed Aug. 29, 2016. The entire disclosure of the above applications are incorporated herein by reference.

TECHNICAL FIELD

The present disclosure relates to a prefabricated dinosaur model, in which a number of parts are assembled to implement a shape and movement similar to an actual dinosaur.

BACKGROUND ART

Unless otherwise indicated herein, the descriptions set forth in this identification section are not prior art to the claims of this application, and are not to be construed as being prior art.

In a narrow sense, dinosaurs (恐龍) mainly refer to terrestrial animals among the large reptiles that appeared in late Mesozoic Triassic period, prospered greatly in Jurassic and Cretaceous period, and became extinct at the end of the Cretaceous. In a broad sense, however, dinosaurs include pterosaurs that were active in the sky and ichthyosaurus that were active in the sea of the same period.

The word 'dinosaurs', which means 'terrible lizard', began to be used by the British anatomist Sir Richard Owen in 1841, at the British Scientific Research Conference in August 1841, to represent a large fossil bone of iguanodon found in 1825.

The dinosaurs are largely divided into two types, Saurischia with a lizard-hipped pelvis and Ornithischia with a bird-hipped. Saurischia is divided into two types: carnivorous dinosaurs walking on two legs (e.g., tyrannosaurus, allosaurus, etc.); and herbivorous dinosaurs walking on four legs (e.g., brachiosaurus, supersaurus, etc.). Ornithischia, all of which are herbivorous dinosaurs, is divided into four types: ornithopoda with long legs like birds; ankylosauria with skin keratin like armor; ceratopsia with horns on the head; and stegosaurs with tail like a knife. These characteristics of dinosaurs are very important factor in discrimination of dinosaurs.

Meanwhile, students interested in dinosaurs are increasing their knowledge of dinosaurs by learning how to identify the type of dinosaurs through the observation of fossilized bones.

Various types of dinosaur models have been produced for the purpose of understanding dinosaurs and of understanding or researching of a skeletal structure thereof, and are used for the purpose of arousing student interest.

A conventional dinosaur model is made of hollow rubber or plastic outer skin only, or in the form of integral figures filled with soft latex. Furthermore, a conventional dinosaur model is custom-made by using wooden boards or plastic plates, or simply constituted by several skeleton shapes, so there is a limitation in utilization because only a simple operation is possible.

As an example, in the document of Korean Patent Application Publication No. 10-2003-0074580 (published Sep. 19, 2003), there has been disclosed a dinosaur toy configured such that a skeleton is subdivided into a spinal bone, a tail bone, a head bone, front and hind leg bones, an anterior chest bone, a pelvic bone, and ribs, and each bone is processed into an individual planar block shape, wherein at least one fitting groove is formed in each bone, and the fitting grooves formed in the respective bones are engaged with each other so as to be assembled and disassembled.

Furthermore, in the document of Korean Utility Model Registration No. 20-0434385 (published Dec. 20, 2006), there has been disclosed a dinosaur toy configured such that a main skeleton of dinosaur is subdivided into blocks to be directly assembled, and the assembled dinosaur can be moved by using a motor and gears to stimulate interest and promote learning effect.

Since the conventional dinosaur model requires only a small number of components to be assembled, there is a limitation in that creative thinking and self-directed learning ability cannot be cultivated through the assembly process. Furthermore, the conventional model is mainly limited to the fitting of plate-shaped parts, which limits clear understanding of the anatomy of the dinosaur.

As a method for overcoming such a problem, in the document of Korean Patent Application Publication No. 10-2014-0053658 (published May 8, 2014) filed by the applicant of the present disclosure, there has been disclosed a prefabricated dinosaur model including: a skeleton frame configured such that a head bone part, a neck bone part, a trunk bone part, and a tail bone part are sequentially connected, and a leg bone part is joined to the trunk bone part to form a skeleton of a dinosaur; an outer skin including a head skin part, a neck skin part, a trunk skin part, a tail skin part, and a leg skin part connected to the head bone part, the neck bone part, the trunk bone part, the tail bone part, and the leg bone part of the skeleton frame, respectively, so as to form the outer skin of the dinosaur; and a connecting member interposed between the skeleton frame and the outer skin to connect the skeleton frame and the outer skin together.

The above conventional prefabricated dinosaur model is problematic in that a large number of assembly parts are excessively divided based on a realistic anatomical structure, and particularly, the connecting member for connecting the outer skin to the skeleton frame is separately provided.

Therefore, the conventional prefabricated dinosaur model requires excessive cost for a mold for manufacturing the actual parts, whereby mass production of the product is impossible, and the excessive purchase cost is passed to the consumers.

DISCLOSURE

Technical Problem

Accordingly, the present disclosure has been made keeping in mind the above problems occurring in the related art, and one object of the present disclosure is to provide a prefabricated dinosaur model, in which the number of parts is minimized within a range that allows movement similar to an actual dinosaur while being free from an anatomical structure of a dinosaur, and at the same time the shape of the parts, particularly, a shape of the skeleton frame is simplified, whereby it is possible to commercialize the prefabricated dinosaur model at a low price.

It is obvious that the present disclosure is not limited to the above-described technical problems and that another technical problem may be derived from the following description.

Technical Solution

According to a preferred embodiment of the present disclosure, a prefabricated dinosaur model includes: a skeleton frame including a head bone part, a neck bone part, a trunk bone part, a tail bone part, and a leg bone part, and forming a skeleton corresponding to an appearance of the dinosaur when assembled; a joint connection part provided at a connection portion of the skeleton frame to enable movement of the skeleton frame; and an outer skin including a head skin part, a neck skin part, a trunk skin part, a tail skin part, and a leg skin part individually corresponding to the skeleton frame, and detachably coupled directly to corresponding parts of the skeleton frame.

The head bone part may include a skull, and a jawbone moveably coupled to the skull to open and close a mouth, a first hinge member may be rotatably connected to an inner side of the skull, and a second hinge member is rotatably connected to an inner side of the jawbone and also connected to the first hinge member, a rotating shaft may be provided at a location where the first hinge member and the second hinge member are connected to each other, and a tongue may be protrudingly provided at a side of the rotating shaft, wherein the tongue is moved back and forth in response to movement of the jawbone with respect to the head bone part such that a fore end portion thereof is moved in and out of the head bone part.

Advantageous Effects

The prefabricated dinosaur model according to a preferred embodiment of the present disclosure is advantageous in that the number of parts is minimized within a range that allows movement similar to an actual dinosaur while being free from an anatomical structure of a dinosaur, and at the same time the shape of the parts, particularly, a shape of the skeleton frame is simplified, whereby it is possible to commercializing the prefabricated dinosaur model at a low price.

The prefabricated dinosaur model according to a preferred embodiment of the present disclosure is further advantageous in that the outer skin can be coupled to the skeleton frame without a separate connecting member, whereby the number of parts can be further reduced, and the manufacturing cost can be reduced accordingly.

The effects of the present disclosure are not limited to the effects mentioned above, and other effects not mentioned can be clearly understood by those skilled in the art from the accompanying claims.

MODE FOR INVENTION

Figure 1:
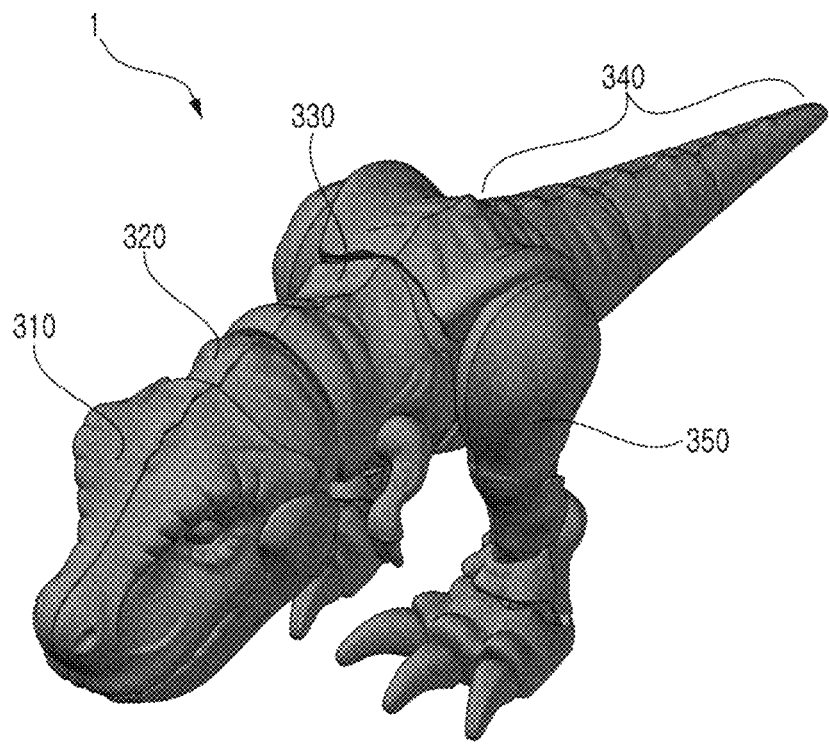
FIG. 1 is a perspective view showing a prefabricated dinosaur model according to an embodiment of the present disclosure.

Herein below, the configuration, operation, and effects of a prefabricated dinosaur model according to a preferred embodiment will be described with reference to the accompanying drawings. For reference, in the following drawings, each element is omitted or schematically shown for convenience and clarity, and the size thereof does not reflect the actual size. Also, throughout the description, the same reference numerals will be used to refer to the same or like elements or parts, and in each drawing, reference numerals for the same or like elements or parts will be omitted.

Figure 2:
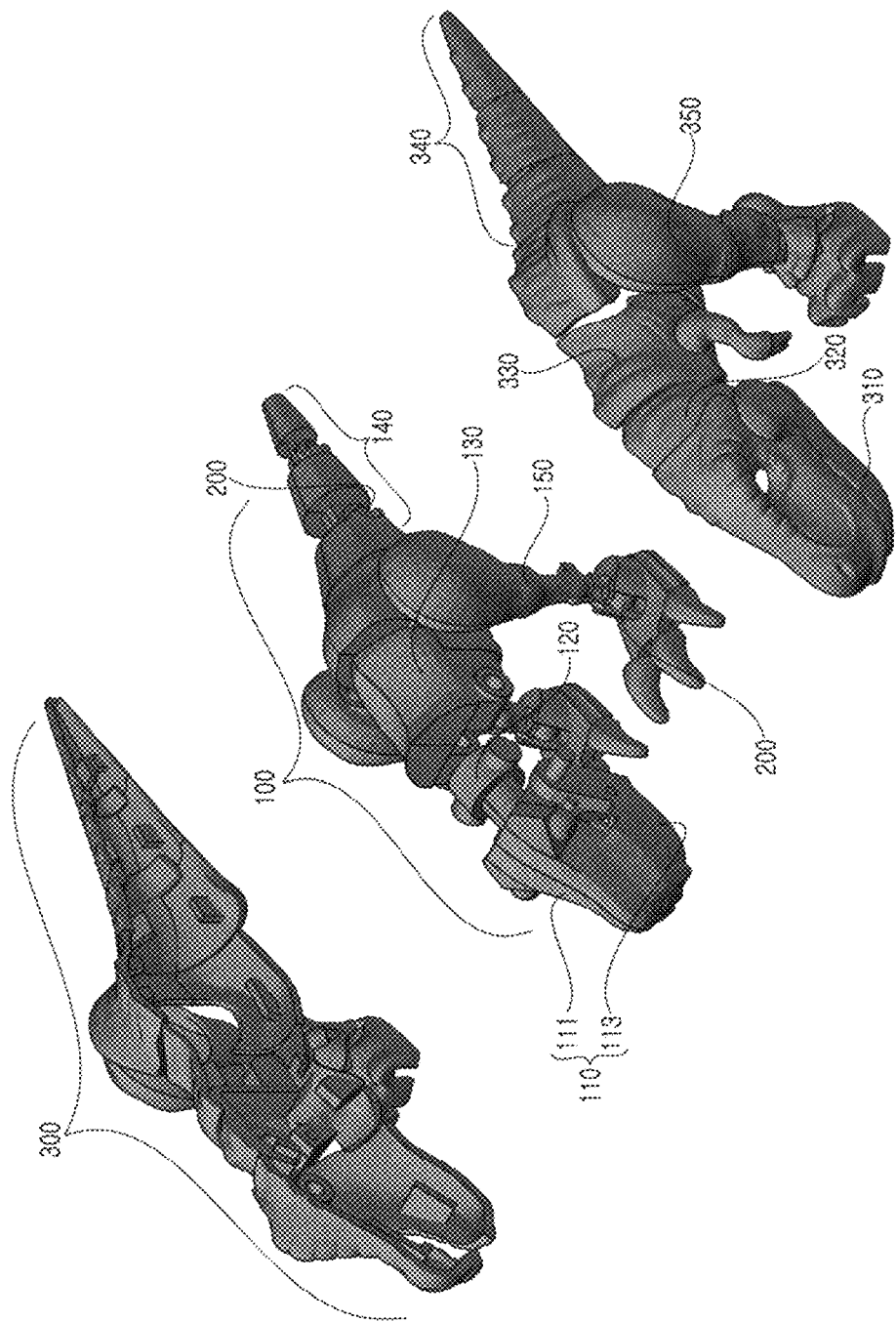
FIG. 2 is an exploded perspective view showing the prefabricated dinosaur model according to the embodiment of the present disclosure.

FIG. 1 is a perspective view showing a prefabricated dinosaur model according to an embodiment of the present disclosure, and FIG. 2 is an exploded perspective view showing the prefabricated dinosaur model according to the embodiment of the present disclosure.

As shown in FIGS. 1 and 2, a prefabricated dinosaur model 1 according to the embodiment of the present disclosure includes: a skeleton frame 100 forming a skeleton of a dinosaur; a joint connection part 200 configured to connect the skeleton frame 100 to allow the prefabricated dinosaur model 1 according to an embodiment of the present disclosure to be moved similar to an actual dinosaur; and an outer skin 300 coupled to the skeleton frame 100 to form an appearance of the dinosaur.

Herein, the skeleton frame 100 is a component that forms an entire skeleton of the dinosaur. The skeleton frame 100 includes: a head bone part 110 forming a skeleton of a head of the dinosaur; a neck bone part 120 forming a skeleton of a neck of the dinosaur; a trunk bone part 130 forming a skeleton of a trunk of the dinosaur; a tail bone part 140 forming a skeleton of a tail of the dinosaur; and a leg bone part 150 forming a skeleton of a leg of the dinosaur.

Furthermore, although not shown, when the dinosaur is a pterosaur, the skeleton frame 100 may further include a wing bone part.

Furthermore, as shown in FIG. 2, it is preferred that the skeleton frame 100 is configured such that most of elements are divided in half and assembled with respect to a center plane.

The joint connection part 200 is a component that allows movement of the skeleton frame 100, and is provided at each connection portion of the skeleton frame 100.

The joint connection part 200 may be a spherical type joint connection part rotatable in all directions regardless of direction in response to the movement of corresponding part, or may be a hinged type joint connection part rotatable only in one direction such as an up and down direction or a side to side direction.

Furthermore, the joint connection part 200 may be a cylindrical sliding type joint connection part or a polygonal sliding type joint connection part that is adjustable in the forward and backward direction in response to the movement of corresponding part.

The outer skin 300 is a component that is coupled to corresponding skeleton frame 100 to form a final appearance of the dinosaur. The outer skin 300 includes: a head skin part 310 coupled to an outer side of the head bone part 110; a neck skin part 320 coupled to an outer side of the neck bone part 120; a trunk skin part 330 coupled to an outer side of the trunk bone part 130; a tail skin part 340 coupled to an outer side of the tail bone part 140; and a leg skin part 350 coupled to an outer side of the leg bone part 150.

Furthermore, although not shown, when the dinosaur is a pterosaur, the outer skin may further include a wing skin coupled to an outer side of the wing bone part of the skeleton frame 100.

In the prefabricated dinosaur model 1 according to the embodiment of the present disclosure, the skeleton frame 100 is manufactured not in an actual anatomical bone shape of the dinosaur but in a shape corresponding to the appearance of the dinosaur in actual assembly. By simplifying the skeleton frame 100, not only can the number of assembly parts be significantly reduced, but also the outer skin 300 made in accordance with the final appearance of the dinosaur can be tightly coupled to the outer side of the skeleton frame 100 without a separate connecting member.

Furthermore, since the outer skin 300 is detachably coupled directly to the outer side of the skeleton frame 100 without a separate connecting member, the number of assembly parts can be further reduced, and the overall manufacturing cost including the mold cost can be reduced accordingly.

The coupling method in which the outer skin 300 is detachably coupled directly to the outer side of the skeleton frame 100 without a separate connecting member may vary widely.

As an example of the coupling method, the outer side of the skeleton frame 100 may be provided with a coupling groove, and the inner side of the outer skin 300 may be provided with a coupling protrusion corresponding to the coupling groove. Furthermore, the outer side of the skeleton frame 100 may be provided with a magnet, and the inner side of the outer skin 300 may be provided with an iron plate or a magnet corresponding to the magnet. Other than this, one of the detachable coupling structures according to known techniques can be selectively applied.

Figure 3:
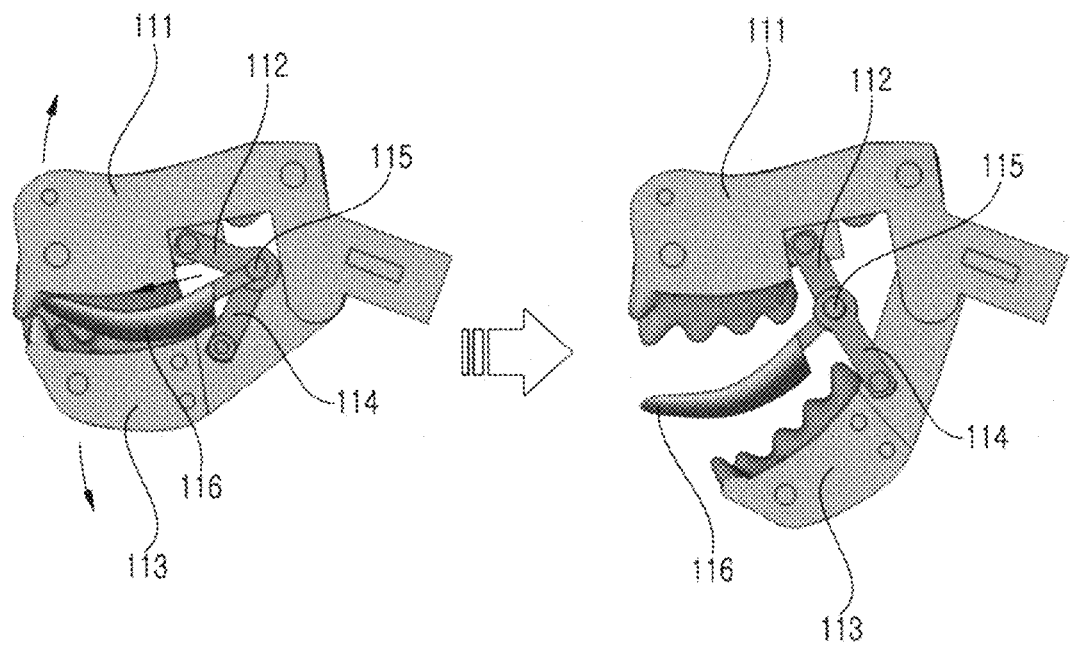
FIG. 3 is a sectional view showing operation of a head part of the prefabricated dinosaur model according to the embodiment of the present disclosure.
Figure 4:
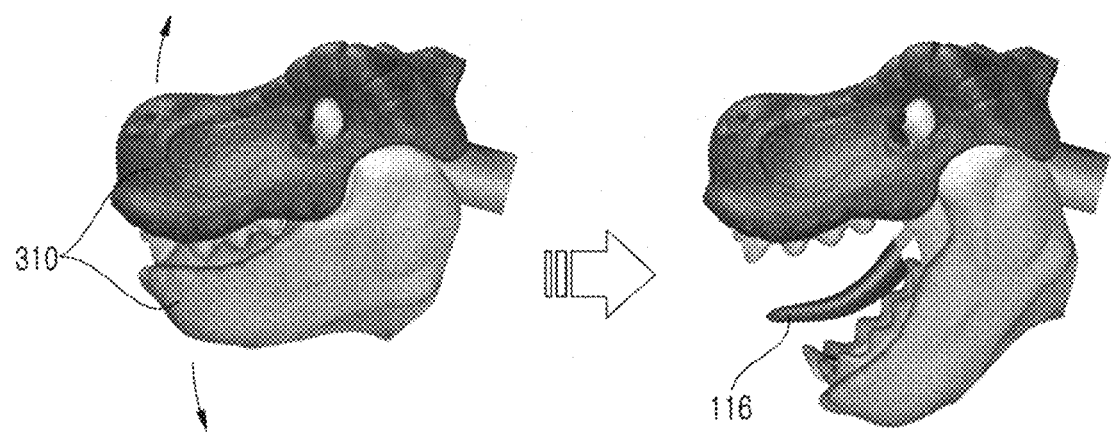
FIG. 4 is a view showing operation of the head part of the prefabricated dinosaur model according to the embodiment of the present disclosure.

FIG. 3 is a view showing operation of a head part of the prefabricated dinosaur model according to the embodiment of the present disclosure, and FIG. 4 is a sectional view showing operation of the head part of the prefabricated dinosaur model according to the embodiment of the present disclosure.

For more realistic dinosaur motion expression, as shown in FIG. 3, it is preferred that the prefabricated dinosaur model 1 according to the embodiment of the present disclosure is configured such that a mouth of the dinosaur is opened and closed in the state where the head skin part 310 is coupled to the head bone part 110, and a tongue 116 is moved in and out of the head bone part 110 with the head skin part 310 being coupled thereto.

The above operation of the prefabricated dinosaur model 1 according to the embodiment of the present disclosure is preferably applied to a dinosaur with a large head such as tyrannosaurus or triceratops rather than a dinosaur with a small head.

To implement opening and closing motion of the dinosaur's mouth, as shown in FIG. 4, the head bone part 110 includes a skull 111, and a jawbone 113 moveably coupled to the skull 111 to open and close the mouth.

Furthermore, to implement the in/out operation of the tongue 116 according to the opening and closing of the dinosaur's mouth, a first hinge member 112 is rotatably connected to an inner side of the skull 111, and a second hinge member 114 is rotatably connected to an inner side of the jawbone 113 and also connected to the first hinge member 112. Furthermore, a rotating shaft 115 is provided at a location where the first hinge member 112 and the second hinge member 114 are connected to each other, and the dinosaur's tongue 116 is protrudingly provided at a front of the rotating shaft 115.

Due to the structure of the above described head bone part 110, when the jawbone 113 is rotated with respect to the skull 111 to open the dinosaur's mouth, the first hinge member 112 and the second hinge member 114 are rotated respectively so that a connection portion between the first hinge member 112 and the second hinge member 114, that is, the rotating shaft 115 can be moved forward, and by the forward movement of the rotating shaft 115, the dinosaur's tongue 116 protrudes toward the front of the dinosaur's mouth.

Furthermore, when the jawbone 113 is rotated in an opposite direction with respect to the skull 111 to close the dinosaur's mouth, the first hinge member 112 and the second hinge member 114 are rotated in opposite directions respectively so that the connection portion between the first hinge member 112 and the second hinge member 114, that is, the rotating shaft 115 can be moved backward, and by the backward movement of the rotating shaft 115, the dinosaur's tongue 116 is accommodated in the dinosaur's mouth.

Figure 5:
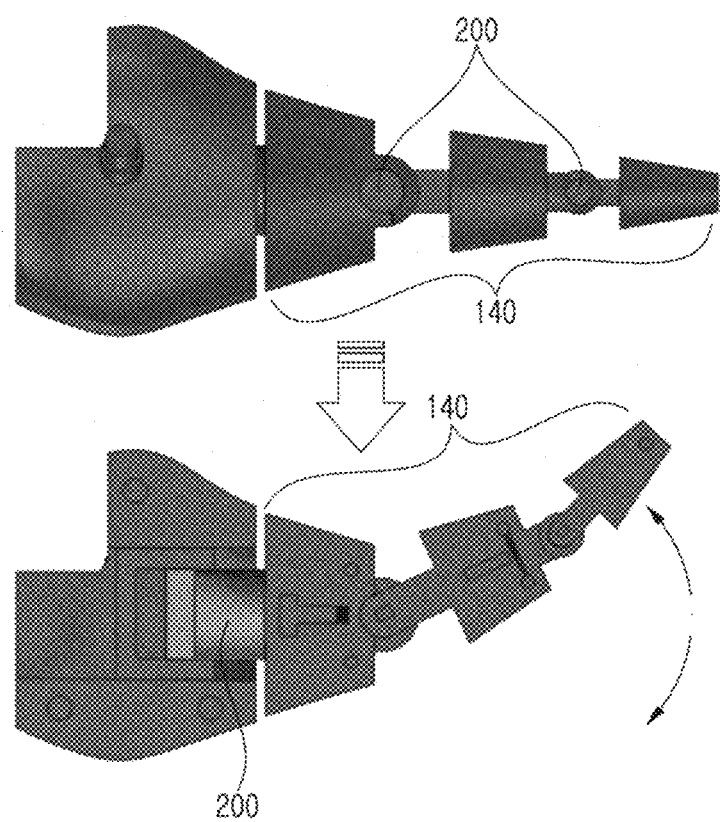
FIG. 5 is a structural view showing a tail part of the prefabricated dinosaur model according to the embodiment of the present disclosure.
Figure 6:
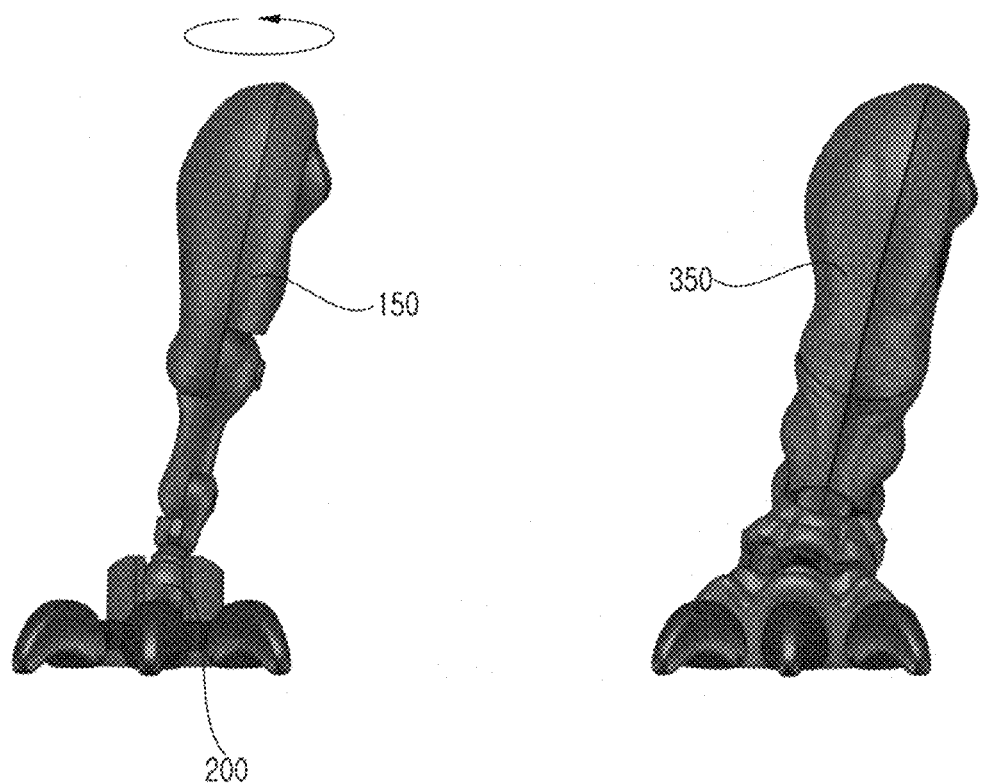
FIG. 6 is a structural view showing a leg part of the prefabricated dinosaur model according to the embodiment of the present disclosure.

FIG. 5 is a structural view showing a tail part of the prefabricated dinosaur model according to the embodiment of the present disclosure, and FIG. 6 is a structural view showing a leg part of the prefabricated dinosaur model according to the embodiment of the present disclosure.

As shown in FIGS. 5 and 6, between each element constituting the tail bone part 140 and the leg bone part 150, various types of joint connection parts 200 are provided.

In other words, as shown in FIG. 5, the cylindrical sliding type joint connection part 200 adjustable in the forward and backward directions and the hinged type joint connection part 200 rotatable in the up and down direction may be provided between joints of the tail bone part 140. This structure of the tail bone part 140 is applicable to realizing the neck bone part 120 of a long-necked dinosaur.

Furthermore, as shown in FIG. 6, the ankle part of the leg bone part 150 may be provided with the spherical type joint connection part 200 rotatable in all directions regardless of direction.

Furthermore, although not shown, between elements of the skeleton frame 100 requiring movement, there may be provided various types of joint connection part 200 suitable for the movement, for example, a spherical type joint connection part, a hinged type joint connection part, a cylindrical sliding type joint connection part, and a polygonal sliding type joint connection part.

Figure 7:
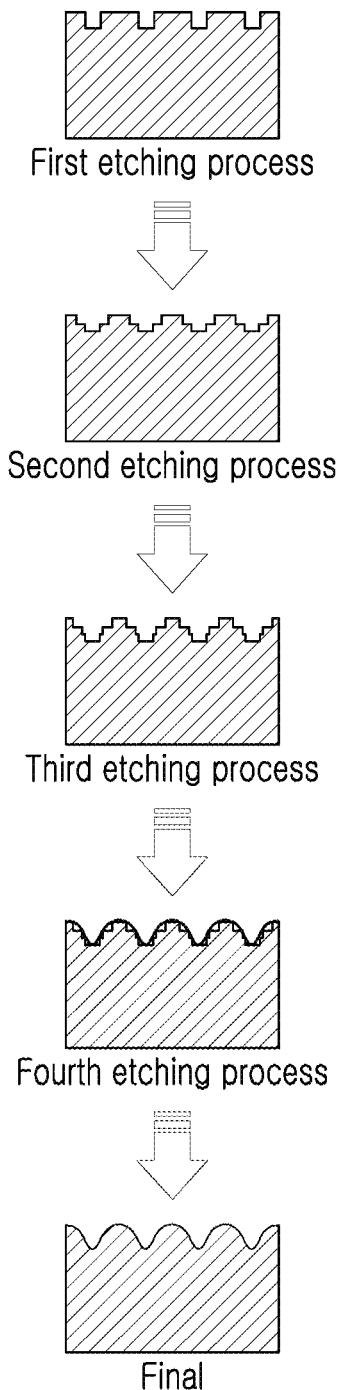
FIG. 7 is a flowchart showing surface machining of an outer skin in the prefabricated dinosaur model according to the embodiment of the present disclosure.
Figure 8:
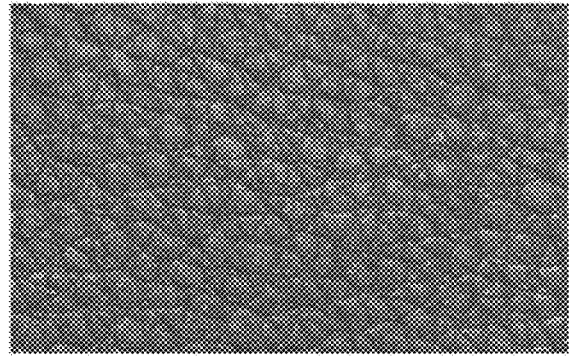
FIGS. 8, 9, and 10 are photographs showing various embodiments of the outer skin surface in the prefabricated dinosaur model according to the embodiment of the present disclosure.
Figure 9:
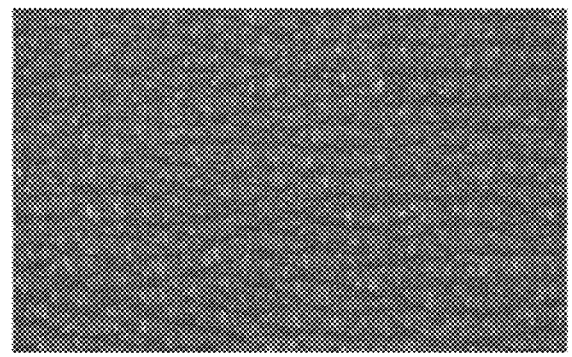
Figure 10:
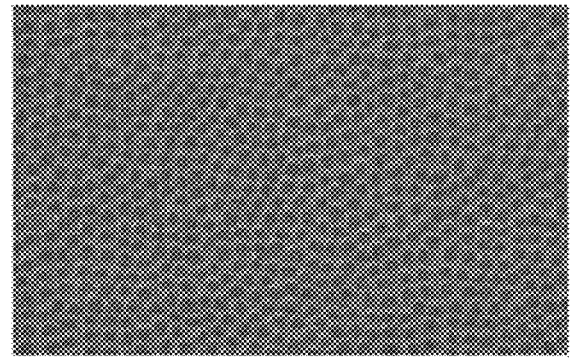

FIG. 7 is a flowchart showing surface machining of an outer skin in the prefabricated dinosaur model according to the embodiment of the present disclosure, and FIGS. 8, 9, and 10 are photographs showing various embodiments of the outer skin surface in the prefabricated dinosaur model according to the embodiment of the present disclosure.

For more realistic dinosaur skin expression, as shown in FIG. 7, the outer skin 300 is configured such that a skin shape suited for the skin texture of each region through a multi-etching method that implements a predetermined skin shape by repeating film transfer and etching several times on the surfaces of the head skin part 310, the neck skin part 320, the trunk skin part 330, the tail skin part 340, and the leg skin part 350.

The multi-etching method, as shown in FIG. 7, may include: a first etching process in which a masking film for forming an initial shape is transferred to the surface of the outer skin 300 and then a predetermined portion is etched away by etching to form the initial shape; a second etching process in which a masking film for forming a contour is transferred to the surface of the outer skin 300 processed by the first etching process and then the predetermined portion is etched away by etching to form the contour; a third etching process in which a masking film for trimming the contour is transferred to the surface of the outer skin 300 processed by the second etching process and then the predetermined portion is etched away by etching to trim the contour; and a fourth etching process in which a masking film for final trimming the contour is transferred to the surface of the outer skin 300 processed by the third etching process and then the predetermined portion is etched away by etching to trim the contour finally.

The skin shaped realized by the multi-etching method may be, for example, one of a rough skin shape as shown in FIG. 8, a normal skin shape as shown in FIG. 9, and a fine skin shape as shown in FIG. 10.

To realize skin texture suitable for the surface of the outer skin 300 of the dinosaur by the multi-etching method, a three-dimensional contour is formed on the surface of the outer skin 300 so that a predetermined texture is felt, and it is possible to realize a texture almost identical to the skin of the actual dinosaur, whereby it is possible to enhance the commercial value of the dinosaur model, improve customer satisfaction, and also provide a function to prevent the dinosaur model from slipping in the hand, especially when the user grips the same.

Figure 11:
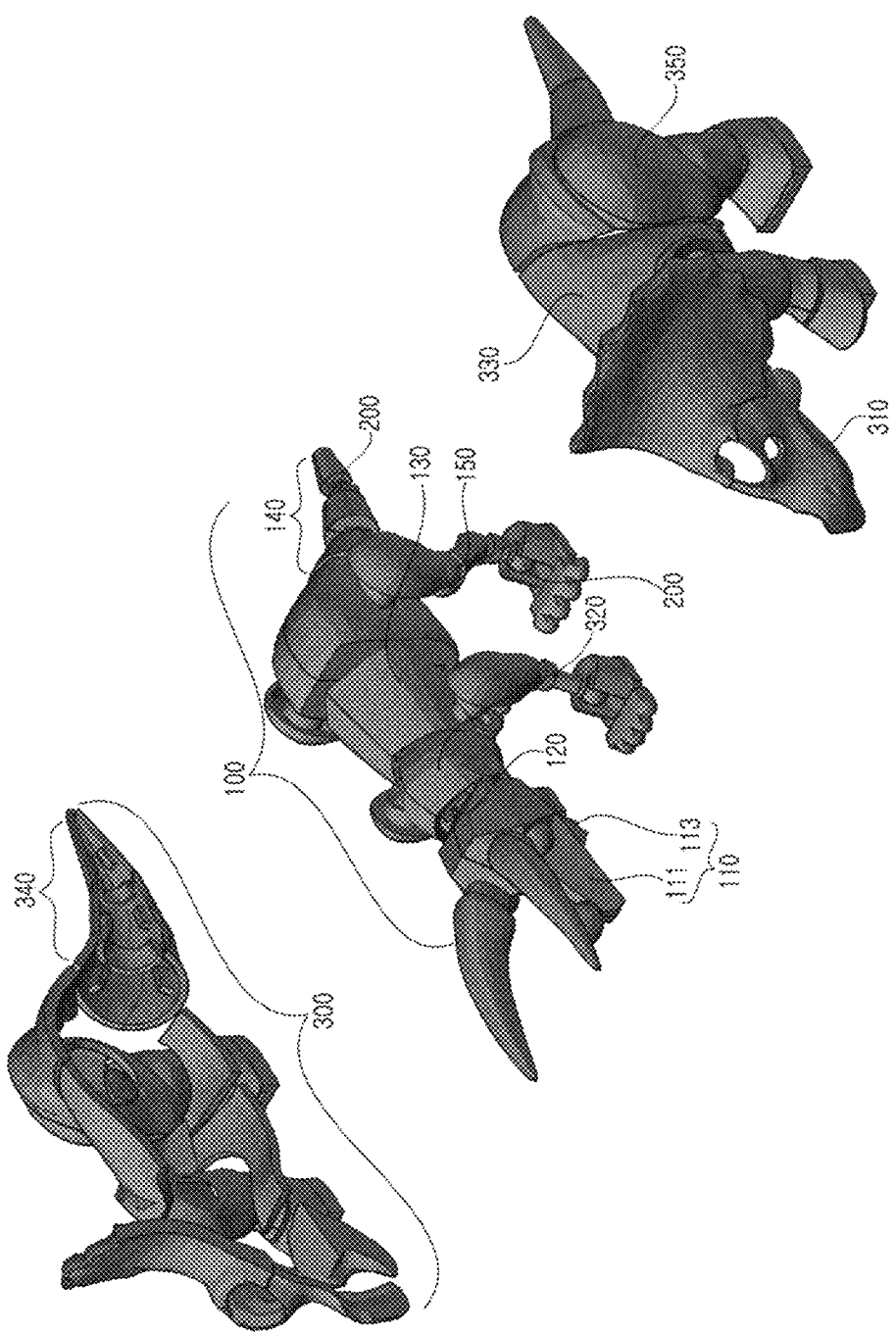
FIG. 11 is an exploded perspective view showing a prefabricated dinosaur model according to another embodiment of the present disclosure.

FIG. 11 is an exploded perspective view showing a prefabricated dinosaur model according to another embodiment of the present disclosure.

The prefabricated dinosaur model 1 of the present disclosure is made based on tyrannosaurus, a carnivorous dinosaur, as shown in FIGS. 1 to 6, but may be made based on triceratops, a herbivorous dinosaur, as shown in FIG. 11, and also may be made based on all kinds of dinosaurs including a pterosaurs which flies, and ichthyosaurus which lives in the sea as well as other terrestrial dinosaurs.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

INDUSTRIAL APPLICABILITY

The prefabricated dinosaur model according to an embodiment of the present disclosure is applicable to toys, educational kits, or the field of sculpture.

The invention claimed is:

1. A prefabricated dinosaur model comprising:
   a skeleton frame including a head bone part, a neck bone part, a trunk bone part, a tail bone part, and a leg bone part, and forming a skeleton corresponding to an appearance of a dinosaur when assembled;
   at least one joint connection part provided at a connection portion of the skeleton frame to enable movement of the skeleton frame; and
   an outer skin including a head skin part, a neck skin part, a trunk skin part, a tail skin part, and a leg skin part individually corresponding to the head bone part, the neck bone part, the trunk bone part, the tail bone part, and the leg bone part, respectively, of to the skeleton frame, and detachably coupled directly to corresponding parts of the skeleton frame;
   wherein the head bone part includes a skull, and a jawbone moveably coupled to the skull to open and close a mouth;
   a first hinge member is rotatably connected to an inner side of the skull, and a second hinge member is rotatably connected to an inner side of the jawbone and also connected to the first hinge member;
   a rotating shaft is provided at a location where the first hinge member and the second hinge member are connected to each other; and
   a tongue is protrudingly provided at a side of the rotating shaft, and the tongue is moved back and forth in response to movement of the jawbone with respect to the skull such that a fore end portion of the tongue is moved in and out of the head bone part.

2. The prefabricated dinosaur model of claim 1, wherein each of B the neck bone part and the tail bone part of the skeleton frame includes a plurality of the joint connection parts.

3. The prefabricated dinosaur model of claim 1, wherein the joint connection part is one of a spherical type, a hinged type, and a cylindrical sliding type.

4. The prefabricated dinosaur model of claim 1, wherein a surface of the outer skin is configured such that a skin shape suitable for skin texture of each part is realized by a multi-etching method that realizes a predetermined skin shape by repeating film transfer and etching several times.

\* \* \* \* \*